US008200738B2

(12) United States Patent
Roush et al.

(10) Patent No.: US 8,200,738 B2
(45) Date of Patent: Jun. 12, 2012

(54) VIRTUAL CLUSTER BASED UPON OPERATING SYSTEM VIRTUALIZATION

(75) Inventors: Ellard T. Roush, Burlingame, CA (US); Zoram Thanga, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 709 days.

(21) Appl. No.: 11/865,037

(22) Filed: Sep. 30, 2007

(65) Prior Publication Data
US 2009/0089406 A1    Apr. 2, 2009

(51) Int. Cl.
 *G06F 15/16*    (2006.01)
(52) U.S. Cl. ............................. 709/201; 718/1
(58) Field of Classification Search .......... 709/220–226, 709/201; 718/1, 100, 104
See application file for complete search history.

(56) References Cited

U.S. PATENT DOCUMENTS

| | | | |
|---|---|---|---|
| 5,940,869 A * | 8/1999 | Schwartz ...................... | 711/206 |
| 7,461,148 B1 * | 12/2008 | Beloussov et al. ............ | 709/226 |
| 7,502,861 B1 * | 3/2009 | Protassov et al. ............. | 709/229 |
| 2002/0184345 A1 * | 12/2002 | Masuyama et al. ........... | 709/220 |
| 2004/0205751 A1 | 10/2004 | Berkowitz et al. | |
| 2004/0243650 A1 * | 12/2004 | McCrory et al. .............. | 707/203 |
| 2005/0216696 A1 * | 9/2005 | Kawaguchi .................... | 711/206 |
| 2005/0235288 A1 | 10/2005 | Yamakabe et al. | |
| 2006/0070069 A1 | 3/2006 | Aguilar, Jr. et al. | |
| 2006/0075278 A1 * | 4/2006 | Kallahalla et al. ............. | 714/4 |
| 2006/0195715 A1 * | 8/2006 | Herington ...................... | 714/4 |
| 2006/0212740 A1 * | 9/2006 | Jackson ......................... | 714/4 |
| 2007/0162363 A1 * | 7/2007 | Chollon et al. ................ | 705/30 |
| 2009/0049443 A1 * | 2/2009 | Powers et al. ................. | 718/100 |
| 2009/0138541 A1 * | 5/2009 | Wing et al. .................... | 709/201 |
| 2009/0150879 A1 * | 6/2009 | Raghunath .................... | 717/173 |
| 2009/0193074 A1 * | 7/2009 | Lee ................................ | 709/203 |
| 2009/0235358 A1 * | 9/2009 | Tolba ............................. | 726/24 |

FOREIGN PATENT DOCUMENTS

| | | |
|---|---|---|
| EP | 1508855 A2 | 2/2005 |
| EP | 1580661 A1 | 9/2005 |
| EP | 1582981 A1 | 10/2005 |
| WO | 2005106659 A1 | 11/2005 |
| WO | 2007021836 A2 | 2/2007 |

OTHER PUBLICATIONS

Under the Hood: The Soul of a Virtual Machine, Robert L. Mitchell, Computerworld Apr. 25, 2005.*

(Continued)

*Primary Examiner* — Ajay Bhatia
(74) *Attorney, Agent, or Firm* — Brooks Kushman P.C.

(57) ABSTRACT

Virtual clusters are based upon virtual operating systems. The physical cluster includes a plurality of physical server nodes. Each physical server node includes a plurality of physical resources and a virtualizing subsystem. The virtualizing subsystem is capable of creating separate environments that logically isolate applications from each other. The separate environments are virtual operating systems. A virtual operating system is configured on each physical server node by defining properties of the virtual operating system. A virtual cluster is composed of a plurality of virtual operating systems that are on a plurality of physical server nodes. A cluster application runs on the virtual cluster. The virtual cluster presents the plurality of virtual operating systems that compose the virtual cluster to the cluster application such that the cluster application is isolated from any other virtual operating systems that compose other virtual clusters on the plurality of physical server nodes.

19 Claims, 4 Drawing Sheets

OTHER PUBLICATIONS

Chase, J.S.; Irwin, D.E.; Grit, L.E.; Moore, J.D.; Sprenkle, S.E.; , "Dynamic virtual clusters in a grid site manager," High Performance Distributed Computing, 2003. Proceedings. 12th IEEE International Symposium on , vol., No., pp. 90-100, Jun. 22-24, 2003.*

Emeneker, Wesley et al., "Dynamic Virtual clustering", Fulton High Performance Computing Initiative Arizona State University, 2007 IEEE International Conference on Cluster Computing, pp. 84-90.

Urgaonkar, Bhuvan et al., "Sharc: Managing CPU and Network Bandwidth in Shared Clusters", IEEE Transactions on Parallel and Distributed Systems, Jan. 2004, pp. 2-17, vol. 15, No. 1, The IEEE Computer Society.

Joost Pronk van Hoogeveen et al., Solaris 10 How to Guides: Consolidating Servers and Applications with Solaris Containers, 2005, Sun Microsystems, Inc., Santa Clara, California.

System Administration Guide: Solaris Containers—Resource Management and Solaris Zones, Part No. 817-1592, 2006, Sun Microsystems, Inc., Santa Clara, California.

Angel Camacho et al., Solaris 10 How to Guides: How to Install and Configure a Two-Node Cluster, 2007, Sun Microsystems, Inc., Santa Clara, California.

Sun Cluster System Administration Guide for Solaris OS, Part No. 817-6546, 2004, Sun Microsystems, Inc., Santa Clara, California.

Sun Cluster Software Installation Guide for Solaris OS, Part No. 819-0420, 2005, Sun Microsystems, Inc., Santa Clara, California.

* cited by examiner

VIRTUAL CLUSTER BASED UPON OPERATING SYSTEM VIRTUALIZATION

BACKGROUND OF THE INVENTION

1. Field of the Invention

The invention relates to cluster applications, resource management, and virtualization techniques.

2. Background Art

The power of computer technology, including CPU, memory, storage, and network, has been growing faster than the needs of many applications. Many users of computer systems, and more specifically clusters, place a single application on that system. This already results in vastly under utilized computer systems. People are willing to use one system per application for several reasons:

Security—placing applications on their own systems ensures the isolation of application data and application processing.

Resource Management—the user of the application clearly can see what resources are being used, and system managers can readily assign costs.

Application Fault Isolation—some application failures require that the entire machine be rebooted in order to clear the problem. The placement of applications on their own machines ensures that the failure of one application does not impact other applications.

The new generation of CPU, memory, storage, and network technology is even more powerful relative to the needs of many computer applications. This will result in computer systems that are mostly idle. Cost factors motivate people to look for ways to better utilize this equipment.

The use of virtualization is increasing. In general, virtualization relates to creating an abstraction layer between software applications and physical resources. There are many approaches to virtualization.

One existing operating system virtualization technique is SOLARIS Containers, available in the SOLARIS operating system from Sun Microsystems, Inc., Santa Clara, Calif. SOLARIS Containers includes several different technologies that are used together to consolidate servers and applications. With server virtualization, applications can be consolidated onto a fewer number of servers. For example, multiple virtual servers may exist on a single physical server.

The SOLARIS Containers approach to implementing virtualization involves a technology referred to as SOLARIS zones and a technology referred to as SOLARIS resource pools. Zones are separate environments on a machine that logically isolate applications from each other. Each application receives a dedicated namespace. Put another way, a zone is a type of sandbox. A resource pool is a set of physical resources such as, for example, processors. The SOLARIS pools facility is used to partition the system resources into a plurality of resource pools for the purposes of resource management. The SOLARIS zones facility is for virtualizing the operating system to improve security, provide isolation and administrative delegation.

When consolidating applications with SOLARIS Containers, physical resources are partitioned into a number of resource pools. A zone may be created for each application, and then one or more zones are assigned to each resource pool.

Another technology involved in SOLARIS Containers is called the Fair Share Scheduler (FSS). The Fair Share Scheduler is used when multiple zones are assigned to the same resource pool. The scheduler software enables resources in a resource pool to be allocated proportionally to applications, that is, to the zones that share the same resource pool.

In an existing implementation of SOLARIS Containers, the pools facility is static. That is, the pool configurations must be defined in advance. However, SOLARIS zones are dynamic. There can be many zones defined; the zones may not all be running at a particular time. Zones can be rebooted or even moved to a new host.

In the SOLARIS Containers approach to virtualization, zones and resource pools provide application containment. Within an application container, the application believes that it is running on its own server; however, the kernel and a number of system libraries are shared between the various containers. As well, the physical resources are shared in accordance with the configured resource pools.

FIGS. 1-3 illustrate an existing implementation of SOLARIS Containers, showing how virtualization allows multiple applications and servers to be consolidated onto a single physical server using application containers composed of zones and resource pools. As shown in FIG. 1, a single physical server 10, using server virtualization, allows the consolidation of an email application 12, a first web server 14, and a second web server 16. The single physical server 10 includes multiple virtual servers such that, after consolidation, each of the email application, first web server, and second web server exists on its own virtual server on server 10.

As best shown in FIG. 2, in order to create the application containers, each application has its own zone 22, 24, and 26. FIG. 3 illustrates the completed example including first and second resource pools 30 and 32, respectively. Zones 22, 24, and 26 are non-global zones; the global zone is indicated at 34. Global zone 34 is the original SOLARIS operating system instance.

With continuing reference to FIG. 3, zone 22 has a dedicated resource pool, pool 32. Zone 24, zone 26, and the global zone 34 share resource pool 30. The Fair Share Scheduler (FSS) proportionally allocates resources to zone 24, zone 26, and global zone 34 in accordance with assigned numbers of shares.

As shown, there are four application containers. The first container is composed of zone 22 and resource pool 32. The second container is composed of zone 24 and resource pool 30. The third container is composed of zone 26 and resource pool 30. The fourth container is composed of global zone 34 and resource pool 30.

Sun Microsystems, Inc. introduced SOLARIS zones in the SOLARIS 10 Operating System. In summary, SOLARIS zones provides:

Security—an application or user within a zone can only see and modify data within that zone.

Resource Management—the system administrator can control the allocation of resources at the granularity of the zone. The system administrator can assign specific resources, such as file systems, to a zone. The system administrator can effectively control the percentage of some resources, such as CPU power, allocated to a zone.

Application Fault Isolation—when an application error condition necessitates a reboot, that reboot becomes a zone reboot when the application resides within a zone. The reboot of one zone does not affect any other zone. Hence, the failure of an application in one zone does not impact applications in other zones.

Many customers are now using zone technology to safely consolidate applications from separate machines onto a single machine. In the existing implementation, zones are limited to a single machine, and do not address the needs of cluster applications. Other existing operating system virtualization technologies also target single machines, and do not address the needs of cluster applications.

Cluster applications are often divided into two categories:

Failover Application—one instance of the application runs on one node at a time. If the machine hosting the application fails, the cluster automatically restarts the application on another node. Failover applications can move between nodes for reasons of load balancing, hardware maintenance, or the whims of the administrator.

Scalable Application—different instances of the application can be running simultaneously on different nodes of the cluster.

Safely consolidating cluster applications requires keeping these applications separate, while respecting the fact that these applications are spread across multiple machines and these applications will dynamically move between machines.

Many cluster applications require information about the status of potential host machines, in other words these applications need an identification of the machines that are operational.

Background information relating to SOLARIS Containers technology may be found in Joost Pronk van Hoogeveen and Paul Steeves, "SOLARIS 10 How To Guides: Consolidating Servers and Applications with SOLARIS Containers," 2005, Sun Microsystems, Inc., Santa Clara, Calif.

Further background information may be found in "System Administration Guide: Solaris Containers-Resource Management and Solaris Zones," Part No.: 817-1592, 2006, Sun Microsystems, Inc., Santa Clara, Calif.

One existing clustering technique is Sun Cluster, available in the SOLARIS operating system from Sun Microsystems, Inc., Santa Clara, Calif.

Background information relating to Sun Cluster technology may be found in Angel Camacho, Lisa Shepherd, and Rita McKissick, "SOLARIS 10 How To Guides: How to Install and Configure a Two-Node Cluster," 2007, Sun Microsystems, Inc., Santa Clara, Calif.

Further background information may be found in "Sun Cluster System Administration Guide for Solaris OS," Part No.: 817-6546, 2004, Sun Microsystems, Inc., Santa Clara, Calif.

Further background information may be found in "Sun Cluster Software Installation Guide for Solaris OS," Part No.: 819-0420, 2005, Sun Microsystems, Inc., Santa Clara, Calif.

Another existing approach to virtualization involves what are referred to as virtual machines. In this approach to virtualization, software running on the host operating system (or in some cases below the host operating system) allows one or more guest operating systems to run on top of the same physical hardware at the same time. In this approach, the guest operating system is a full operating system, including the kernel and libraries. Existing virtual machine technologies support multiple operating system images on a single machine. However, virtual machines, when compared to virtual operating systems, place significant burden on a physical machine and place significant overhead on virtualized resources.

SUMMARY OF INVENTION

It is an object of the invention to provide a virtualization technology that addresses the needs of cluster applications.

In accordance with the invention, a method of implementing virtual clusters on a physical cluster is provided. The physical cluster includes a plurality of physical server nodes. Each physical server node includes a plurality of physical resources and a virtualizing subsystem. The virtualizing subsystem is capable of creating separate environments on the physical server node that logically isolate applications from each other. The separate environments are virtual operating systems.

The method comprises configuring a virtual operating system on each physical server node by defining properties of the virtual operating system. The method further comprises configuring a virtual cluster composed of a plurality of virtual operating systems that are on a plurality of physical server nodes.

A cluster application runs on the virtual cluster. The virtual cluster presents the plurality of virtual operating systems that compose the virtual cluster to the cluster application such that the cluster application is isolated from any other virtual operating systems that compose other virtual clusters on the plurality of physical server nodes.

The cluster application may be a failover application that runs on one virtual operating system at a time within the virtual cluster. As well, the cluster application may be a scalable application wherein different instances of the scalable application run simultaneously on different virtual operating systems within the virtual cluster.

DETAILED DESCRIPTION OF THE PREFERRED EMBODIMENT

The preferred embodiment of the invention comprehends a virtual cluster based upon SOLARIS zones. It is appreciated that a virtual cluster based upon zones is one embodiment of the invention; virtual clusters may be implemented in accordance with the invention based upon other operating system virtualization techniques.

1. Virtual Cluster Based Upon Zones Properties

The preferred embodiment of the invention builds a virtual cluster based upon zones. Under this approach, each virtual node is a zone. This approach presents the illusion to the application that the application is running on a physical cluster dedicated to that application.

Figure 1:
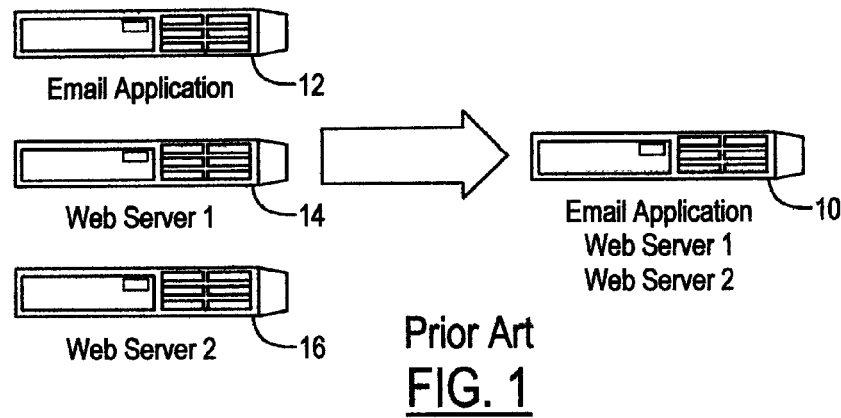
FIG. 1-3 illustrate an example of server virtualization in an existing implementation of SOLARIS Containers.
Figure 2:
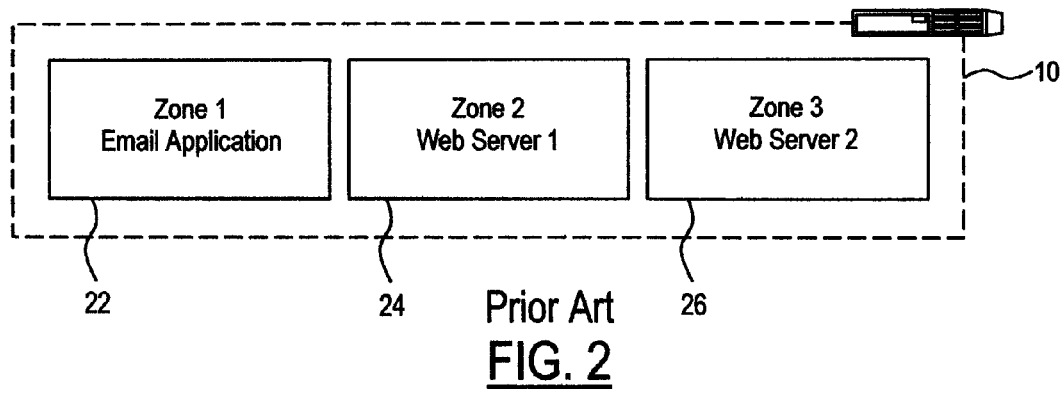
Figure 3:
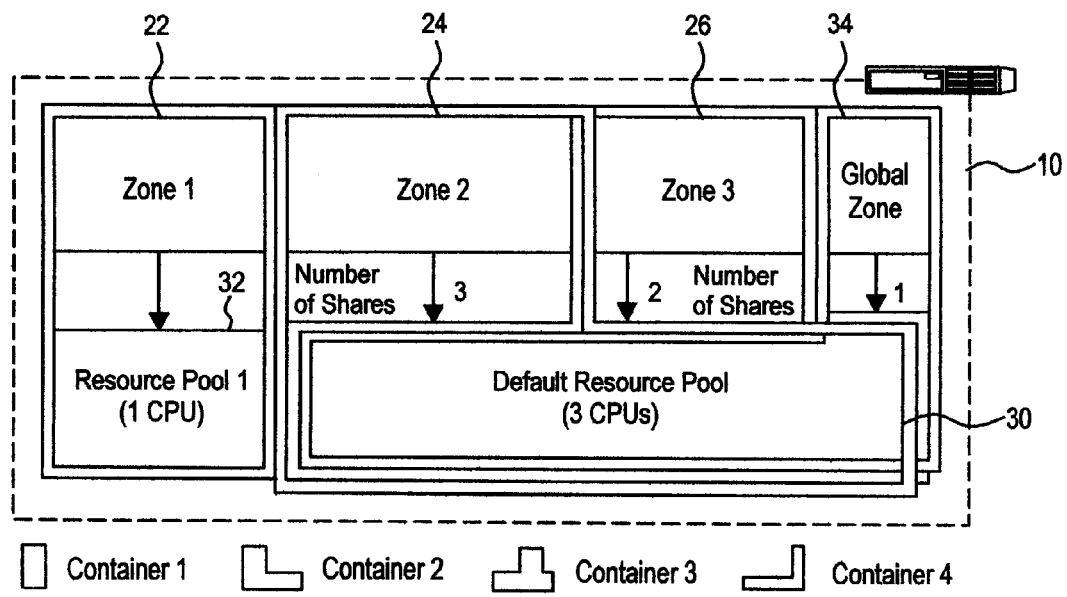
Figure 4:
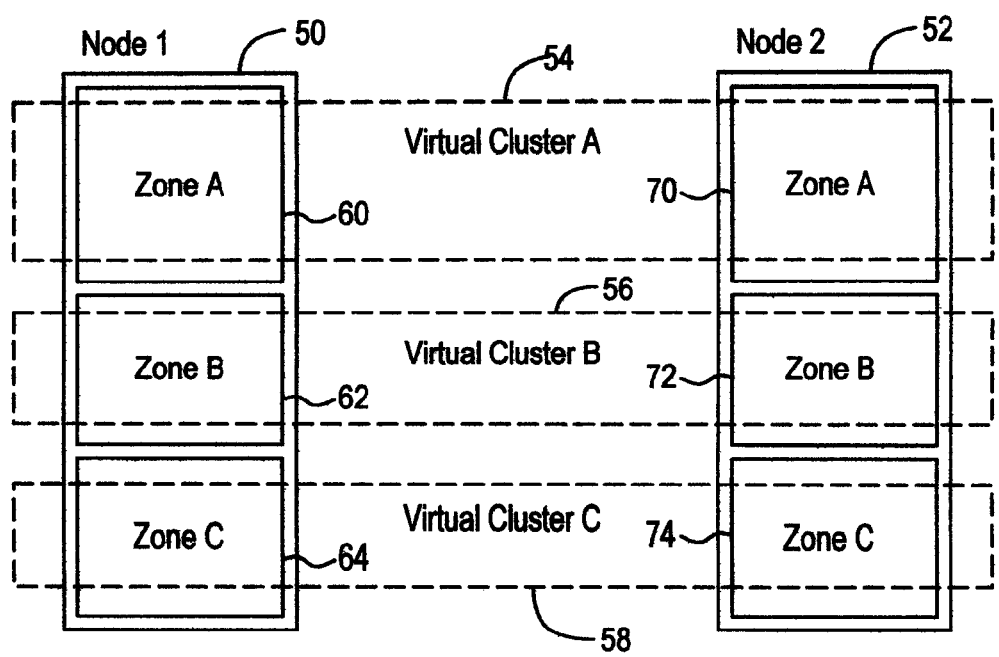
FIG. 4 illustrates an example of a two-node physical cluster hosting three virtual clusters in an exemplary implementation of the invention.

FIG. 4 shows an example of a two-node physical cluster hosting three different virtual clusters. In more detail, first and second nodes 50 and 52 form the physical cluster. The three virtual clusters are indicated at 54, 56, and 58. In general, a computer cluster is a group of tightly coupled computers. In this example, each node 50, 52 is a computer running the SOLARIS operating system. SOLARIS zones provides first zone 60, second zone 62, and third zone 64 on node 50. As well, SOLARIS zones provides first zone 70, second zone 72, and third zone 74 on node 52. Virtual cluster 54 is composed of a pair of virtual nodes which are zones 60 and 70. Virtual cluster 56 is composed of a pair of virtual nodes which are zones 62 and 72. Virtual cluster 58 is composed of a pair of virtual nodes which are zones 64 and 74.

1.1 Virtual Cluster=Cluster Application Container

Applications within a virtual cluster 54, 56, 58 always remain within that virtual cluster:

An application within a virtual cluster can only move between the virtual nodes of the virtual cluster.

All instances of a scalable application must reside within the same virtual cluster.

This means that the virtual cluster 54, 56, 58 is a cluster-wide container for applications that can be used to separate cluster applications.

1.2 Access Control

The virtual cluster 54, 56, 58 provides a well-defined boundary for access control purposes. An application within a virtual cluster can only see things within the virtual cluster, and can only modify things within the virtual cluster.

1.3 Resource Management

The virtual cluster 54, 56, 58 uses the zone resource management facilities. A system administrator must explicitly configure a zone to use any specific resource, such as a specific file system, or that resource will not be available. This provides the capability to isolate the resources of different cluster applications running in virtual clusters. The system administrator can explicitly control the usage of CPUs and memory at the zone level. This continues to be applicable for virtual clusters.

Figure 6:
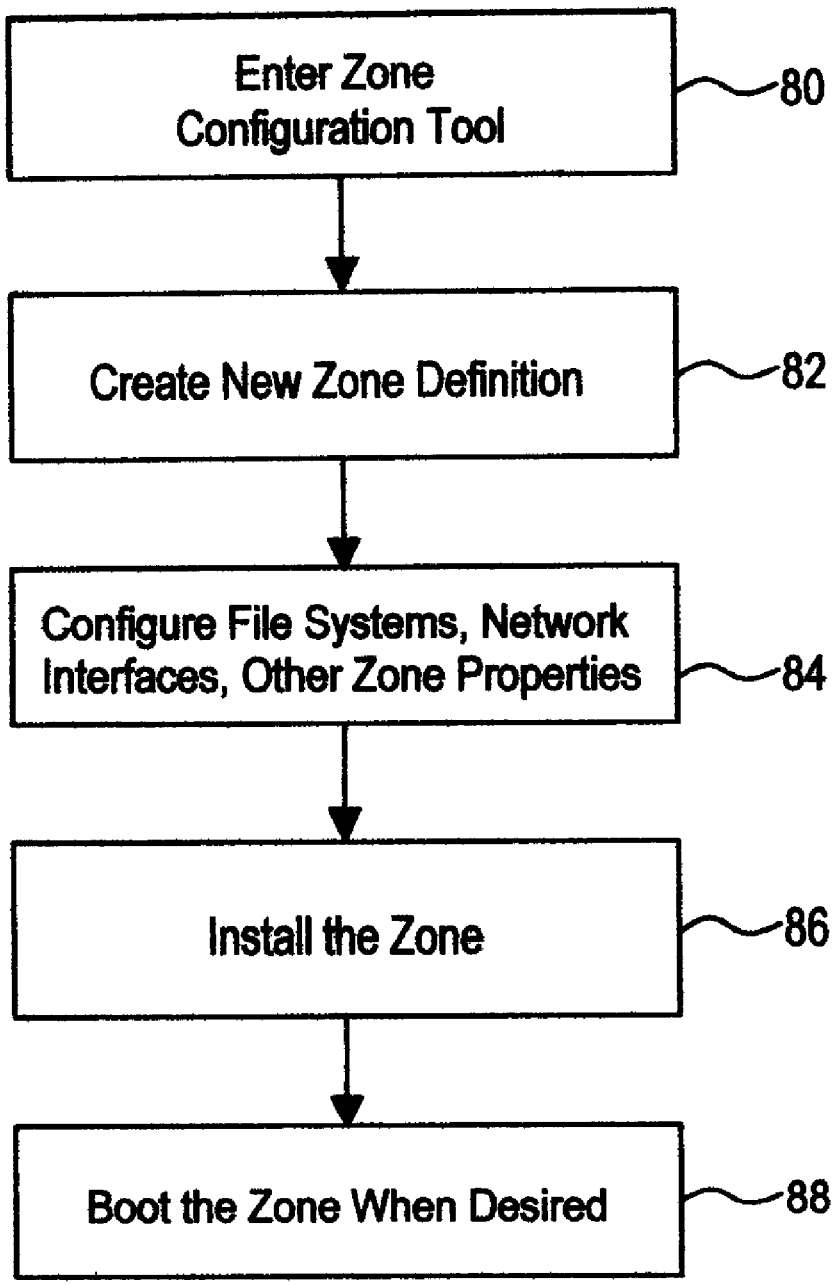
FIG. 6 illustrates the configuration and installation of a zone.

FIG. 6 illustrates an example of the configuration and installation of a zone. In order to configure a new zone, the zone configuration tool is entered at block 80. A new zone definition is created at block 82. The new zone is assigned to a file system, and network parameters are configured, at block 84. Other zone properties may also be configured at block 84. Once the zone configuration is completed, the new zone is installed, as indicated at block 86. As indicated at block 88, the installed zone may be booted when desired.

1.4 Application Fault Isolation

When an application running in a virtual cluster 54, 56, 58 enters an error state and calls for a node reboot, the virtual cluster reboots the virtual node, which becomes a zone reboot. This means that the failure of an application within one virtual cluster does not impact cluster applications running in other virtual clusters.

1.5 Membership

A cluster application inside a virtual cluster 54, 56, 58 sees only the membership status of the virtual cluster. A virtual cluster can run on all nodes of the physical cluster or a subset of the nodes of the physical cluster. The physical cluster and virtual cluster membership information take the same form. Thus there is no difference in this area with respect to whether an application runs in a physical cluster or in a virtual cluster.

1.6 Delegated Application Administration

The virtual cluster 54, 56, 58 supports the administration of applications from within the virtual cluster. The application administrator can only see and only affect applications and resources within that virtual cluster. The administrator in the global zone (or physical cluster) can establish or remove dependencies between applications in different zones. For example, the administrator in the global zone could establish a dependency relationship of SAP in one virtual cluster upon an ORACLE RAC data base in another virtual cluster.

1.7 Namespace Isolation

The virtual cluster 54, 56, 58 provides separate namespaces for the information about applications. The virtual cluster provides separate namespaces for the lookup of private network IP addresses.

1.8 Single Point of Administration

The entire virtual cluster 54, 56, 58 can be administered by a single command from any node.

1.8.1 Platform Administration

The single point of administration principle applies to the administration of the virtual cluster platform.

1.8.2 Application Administration

The single point of administration principle applies to the administration of applications running in the virtual cluster.

2. Virtual Cluster Based Upon Zones Implementation

This section describes the primary features of the implementation of the preferred embodiment of the invention.

2.1 Components

Each virtual cluster 54, 56, 58 consists of a set of virtual nodes 60 and 70, 62 and 72, 64 and 74 where each virtual node is a zone. The SOLARIS zone provides a container for applications. The preferred embodiment of the invention leverages that feature and establishes a specific relationship with virtual nodes on other machines. Each virtual node has the following resources:

File Systems—Local file systems are only accessible from that virtual node, and Cluster file systems are accessible from all virtual nodes at the same place.

Private IP Addresses—these support communications between virtual nodes.

Public IP Addresses—these support communications between the cluster and the outside world.

Figure 5:
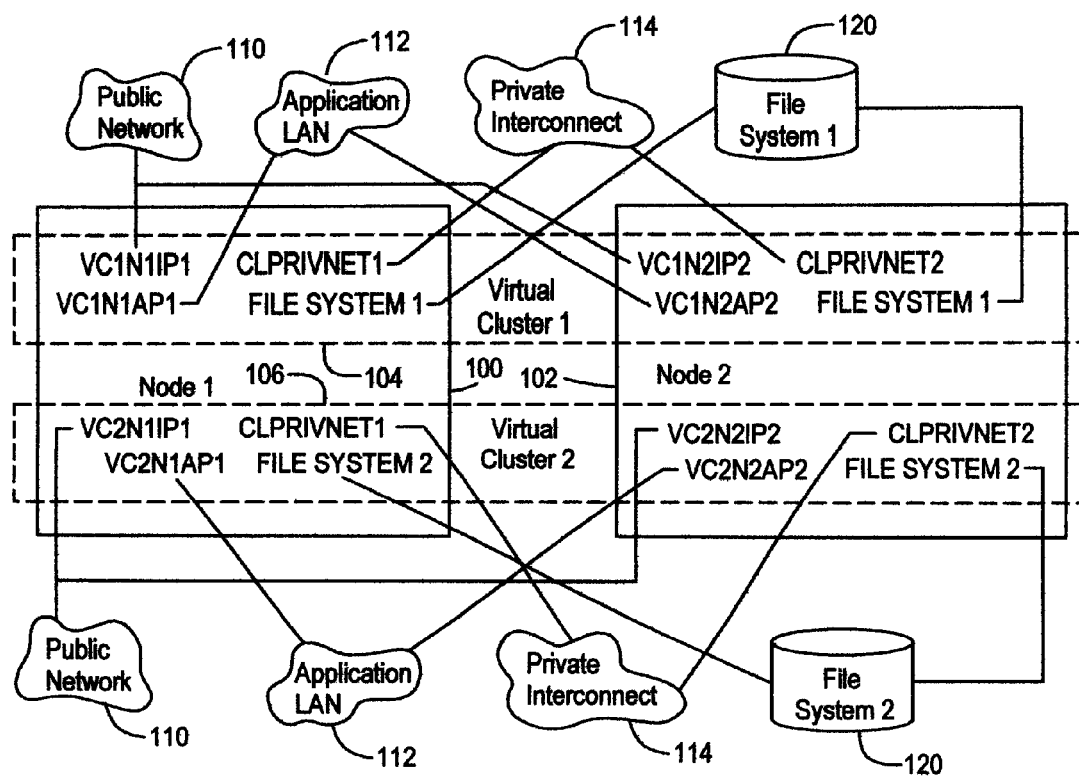
FIG. 5 illustrates two virtual clusters showing assigned resources in an exemplary implementation of the invention.

Devices—the virtual cluster supports the use of storage devices without requiring the use of a file system The virtual cluster 54, 56, 58 leverages a number of zone configuration properties. The administrative tools ensure that the security related-properties of all zones always remain consistent. This means that the system can substitute the local zone when servicing a remote request. FIG. 5 shows an example of the resources assigned to two virtual clusters configured on one two-node physical cluster.

In more detail, nodes 100 and 102 compose the physical cluster. The virtual clusters are indicated at 104 and 106.

The Public Network 110 refers to network access outside the cluster. The Application LAN 112 represents the IP address used to communicate between applications locally. The Private Interconnect 114 refers to the IP address based communication between the instances of a scalable application running on multiple nodes of the virtual cluster. Each virtual cluster uses its own cluster file system 120. The networks can be shared but the IP addresses cannot be shared. The cluster file systems should not be shared.

2.2 Administration

2.2.1 Creation & Configuration

The command clzonecluster supports the creation of the entire virtual cluster 104, 106 in a single command from any node 100, 102 of the physical cluster. The same command clzonecluster supports configuration of an existing virtual cluster.

2.2.2 Management

The command clzonecluster supports actions upon the virtual cluster. A clzonecluster subcommand boots the entire cluster or a single virtual node. Similarly, a clzonecluster subcommand halts the entire cluster or a virtual node. A clzonecluster subcommand provides status information about the virtual nodes.

2.3 Configuration Repository

Each virtual cluster 104, 106 has its own separate Configuration Repository, which contains all of the configuration information about that virtual cluster. This provides a separate namespace for each virtual cluster.

2.4 Membership

Physical cluster membership information consists of a set of node-number/node-incarnation number pairs that identifies the physical nodes that are currently alive. The virtual cluster presents membership information in exactly the same format: virtual-node-number/virtual-node-incarnation pairs.

A zone can fail independently of the physical node hosting that zone. Also, administrative commands can be used to halt a zone, while leaving the physical node operational. The system provides membership information of each virtual cluster 104, 106 that presents the state of which virtual nodes are operational. The specific implementation uses callbacks from the BrandZ feature set of SOLARIS zones to determine when a zone boots or shuts down.

2.5 Namespace Isolation

The virtual cluster 104, 106 provides separate namespaces for the following:

Application Management—the system uses separate information repositories for each virtual cluster to support application management.

Private IP Addresses—the system has separate tables for supporting lookups of IP addresses for the private interconnect.

Component—the system uses a name server for locating software components. This name server determines the virtual cluster where the request originated and responds with the software component for that virtual cluster. This supports the cluster infrastructure by making it possible to have multiple copies of cluster software components, while ensuring that requests reach the software component for that virtual cluster.

2.6 Application Support

Each virtual cluster 104, 106 has its own subsystem for managing the applications within a virtual cluster.

On Sun Cluster, the Resource Group Management (RGM) subsystem is the name of this subsystem. RGM controls where an application runs. RGM only allows an application within a virtual cluster to run on a virtual node belonging to that virtual cluster. RGM manages the resources needed by an application. RGM mounts the file system needed by an application. RGM sets up the IP address needed by an application. This principle applies to other resources. RGM validates that an administrator operating within the virtual cluster can only specify a dependency upon a resource within the virtual cluster. The system validates the resource again when about to activate the resource.

It is to be appreciated that the preferred embodiment of the invention is implemented with SOLARIS zones and Sun Cluster. Specifically, SOLARIS zones is leveraged to implement virtual clusters based on zones. The invention is not limited to SOLARIS zones, and virtual clusters may be based upon other operating system virtualization techniques.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of implementing virtual clusters on a physical cluster, the physical cluster including a plurality of physical server nodes, each physical server node including a plurality of physical resources and a virtualizing subsystem, the virtualizing subsystem being capable of creating separate environments on the physical server node that logically isolate applications from each other, wherein the separate environments are virtual operating systems, the method comprising:

configuring a plurality of virtual operating systems on each physical server node by defining properties of each virtual operating system, wherein the plurality of virtual operating systems on a physical server node share a kernel and share a number of system libraries;

configuring a virtual cluster composed of a plurality of virtual operating systems that are on a plurality of physical server nodes;

running a cluster application on the virtual cluster, wherein the virtual cluster presents the plurality of virtual operating systems that compose the virtual cluster to the cluster application such that the cluster application is isolated from any other virtual operating systems on the plurality of physical server nodes.

2. The method of claim 1 wherein the cluster application is a failover application that runs on one virtual operating system at a time within the virtual cluster.

3. The method of claim 1 wherein the cluster application is a scalable application wherein different instances of the scalable application run simultaneously on different virtual operating systems within the virtual cluster.

4. The method of claim 1 further comprising:

rebooting one of the virtual operating systems that compose the virtual cluster in response to the cluster application entering an error state.

5. The method of claim 1 wherein the virtual operating systems that compose the virtual cluster each have a local file system, the local file system for a particular virtual operating system only being accessible from that particular virtual operating system.

6. The method of claim 1 wherein the virtual cluster has a cluster file system that is accessible, at the same place, from all virtual operating systems that compose the virtual cluster.

7. The method of claim 1 wherein the virtual operating systems that compose the virtual cluster each have at least one private network address for communications between virtual operating systems within the virtual cluster.

8. The method of claim 1 wherein the virtual operating systems that compose the virtual cluster each have at least one public network address for communications external to the virtual cluster.

9. A method of implementing virtual clusters on a physical cluster, the physical cluster including a plurality of physical server nodes, each physical server node including a plurality of physical resources and a virtualizing subsystem, the virtualizing subsystem being capable of creating separate environments on the physical server node that logically isolate applications from each other, wherein the separate environments are virtual operating systems, the method comprising:

configuring a plurality of virtual operating systems on each physical server node by defining properties of each virtual operating system, wherein the plurality of virtual operating systems on a physical server node share a kernel and share a number of system libraries;

configuring a plurality of virtual clusters, each virtual cluster being composed of a plurality of virtual operating systems that are on a plurality of physical server nodes;

running a cluster application on each virtual cluster, wherein the cluster application on each virtual cluster is isolated from any other virtual operating systems that compose other virtual clusters on the plurality of physical server nodes.

10. The method of claim 9 wherein at least one cluster application is a failover application that runs on one virtual operating system at a time within a virtual cluster.

11. The method of claim 9 wherein at least one cluster application is a scalable application wherein different instances of the scalable application run simultaneously on different virtual operating systems within a virtual cluster.

12. The method of claim 9 further comprising:
rebooting one of the virtual operating systems that compose a virtual cluster in response to an error state.

13. The method of claim 9 wherein the virtual operating systems that compose one of the virtual clusters each have a local file system, the local file system for a particular virtual operating system only being accessible from that particular virtual operating system.

14. The method of claim 9 wherein at least one virtual cluster has a cluster file system that is accessible, at the same place, from all virtual operating systems that compose the at least one virtual cluster.

15. The method of claim 9 wherein the virtual operating systems that compose one of the virtual clusters each have at least one private network address for communications between virtual operating systems within the virtual cluster.

16. The method of claim 9 wherein the virtual operating systems that compose one of the virtual clusters each have at least one public network address for communications external to the virtual cluster.

17. A computer cluster comprising:
a plurality of physical server nodes, each physical server node including a plurality of physical resources and a virtualizing subsystem, the virtualizing subsystem being capable of creating separate environments on the physical server that logically isolate applications from each other, wherein the separate environments are virtual operating systems;
a plurality of virtual operating systems on each physical server node, wherein the plurality of virtual operating systems on a physical server node share a kernel and share a number of system libraries;
a virtual cluster composed of a plurality of virtual operating systems that are on a plurality of physical server nodes;
a cluster application on the virtual cluster, wherein the virtual cluster presents the plurality of virtual operating systems that compose the virtual cluster to the cluster application such that the cluster application is isolated from any other virtual operating systems on the plurality of physical server nodes.

18. The computer cluster of claim 17 wherein the cluster application is a failover application that runs on one virtual operating system at a time within the virtual cluster.

19. The computer cluster of claim 17 wherein the cluster application is a scalable application wherein different instances of the scalable application run simultaneously on different virtual operating systems within the virtual cluster.

* * * * *